United States Patent
Youssef

(10) Patent No.: US 10,239,345 B2
(45) Date of Patent: Mar. 26, 2019

(54) SMART MARKER

(71) Applicant: Sony Corporation, Tokyo (JP)

(72) Inventor: Mohamed Youssef, San Diego, CA (US)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 15/605,025

(22) Filed: May 25, 2017

(65) Prior Publication Data

US 2018/0339543 A1 Nov. 29, 2018

(51) Int. Cl.
| | |
|---|---|
| G06F 3/0354 | (2013.01) |
| B43K 29/00 | (2006.01) |
| B43L 1/00 | (2006.01) |
| G01S 19/13 | (2010.01) |
| G01C 19/00 | (2013.01) |
| G01P 15/00 | (2006.01) |
| G06F 3/038 | (2013.01) |
| G06K 9/22 | (2006.01) |

(52) U.S. Cl.
CPC ............... B43K 29/00 (2013.01); B43L 1/00 (2013.01); G01C 19/00 (2013.01); G01P 15/00 (2013.01); G01S 19/13 (2013.01); G06F 3/0383 (2013.01); G06F 3/03545 (2013.01); G06K 9/222 (2013.01)

(58) Field of Classification Search
CPC ... B43K 29/00; G06F 3/0383; G06F 3/03545; G01C 19/00; G01S 19/13; B43L 1/00; G01P 15/00; G06K 9/222
See application file for complete search history.

(56) References Cited

U.S. PATENT DOCUMENTS

| | | | |
|---|---|---|---|
| 6,456,280 B2 | 9/2002 | Holtzman | |
| 2005/0073508 A1* | 4/2005 | Pittel | G06F 1/3203 345/175 |
| 2006/0087677 A1* | 4/2006 | Maciejewski | G06F 1/1616 358/1.15 |
| 2007/0070358 A1* | 3/2007 | Ouchi | G01S 17/875 356/614 |

(Continued)

FOREIGN PATENT DOCUMENTS

| | | |
|---|---|---|
| CN | 102207801 A | 10/2011 |
| CN | 101882032 B | 4/2013 |
| WO | 2016171166 A1 | 10/2016 |

*Primary Examiner* — Premal R Patel
(74) *Attorney, Agent, or Firm* — John L. Rogitz

(57) ABSTRACT

Conventional whiteboards or chalkboards on which writing is effected using Dry-Erase or chalk markers are enabled for digital conversion of the writing into the digital domain. An indoor positioning subsystem determines the absolute position of a marker with a dry-erase or another conventional writing tip within a local coordinate system to track the location of the marker on the board. Ultra wide band (UWB) is an example technology that may be used for this purpose. An inertial sensor in the marker captures sensor data generated by handwriting by sensing the movement of the marker, essentially tracking the relative positioning and motion of the handwriting. The absolute position and relative positions are then processed to generate digital handwriting which may be refined using deep learning subsystem (s) for handwriting recognition and classification for the data captured by the inertial sensor to determine the most appropriate character or shape of the writing.

19 Claims, 4 Drawing Sheets

(56) References Cited

U.S. PATENT DOCUMENTS

| | | | |
|---|---|---|---|
| 2012/0189227 A1* | 7/2012 | Cohen | G06F 3/03 382/314 |
| 2013/0278537 A1* | 10/2013 | Hansen | G06F 3/041 345/174 |
| 2013/0321356 A1* | 12/2013 | Al-Sharif | G06F 3/03545 345/179 |
| 2014/0168174 A1* | 6/2014 | Idzik | G06F 3/046 345/179 |
| 2016/0048209 A1* | 2/2016 | Park | G06F 1/1626 345/173 |
| 2016/0357388 A1* | 12/2016 | Paine | G06F 9/451 |
| 2016/0370986 A1 | 12/2016 | Duan et al. | |
| 2017/0180988 A1* | 6/2017 | Kim | H04L 63/0861 |
| 2018/0018057 A1* | 1/2018 | Bushnell | G06F 3/0488 |
| 2018/0081456 A1* | 3/2018 | Li | G06F 3/03545 |

\* cited by examiner

SMART MARKER

FIELD

The present application relates to technically inventive, non-routine solutions that are necessarily rooted in computer technology and that produce concrete technical improvements.

BACKGROUND

Non-computerized whiteboards and chalkboards remain in ubiquitous use, on which people conveniently can write using Dry-Erase or chalk markers for other people typically in a group in a room to read, and then easily erase what was written to make room for new writings or drawings. As understood herein, once the writing on such conventional boards is erased, unless someone has copied it or typed it into a computer it is gone for good.

For this reason, technologies have been introduced to turn writing on a vertical surface into the digital domain. However, such technologies require a replacement for the conventional white/black board.

SUMMARY

Present principles recognize the above problems, and so provide a system that includes at least one hand-holdable marker with a substance-dispensing end and at least one substrate a person can mark on by moving the substance-dispensing end of the marker against the substrate to cause substance from the substance-dispensing end to be deposited on the substrate. At least one motion sensor is operably associated with the marker to sense motion of the marker. At least one processor is configured for receiving signals from the motion sensor for conversion of the signals to a digital domain.

In example embodiments, the motion sensor includes at least one gyroscope on the marker and/or at least one accelerometer and/or at least an image sensor on the marker.

In some embodiments at least one location system is configured for generating signals representative of a location of the marker relative to the substrate. The location system may at least first RF transmitter, for example an ultra wideband (UWB) transceiver, and the location system can include at least a second RF transmitter, for example an UWB transceiver, that is not on the marker and that is configured for communicating with the first RF transceiver. Or, the location system may include at least one Global Satellite Navigation System (GNSS) (e.g. GPS) transceiver on the marker. If desired, the processor may execute at least one machine learning algorithm for conversion of the signals from the motion sensor to a digital domain.

In another aspect, a system includes three subsystems. A first subsystem is configured to determine an absolute position of a marker with a substance-depositing writing tip relative to a marker board. A second subsystem on the marker is configured to capture sensor data generated by handwriting on the marker board using the marker. A third subsystem generates digital handwriting refined using a machine/deep learning algorithm for handwriting or gesture recognition based on data from the first and second subsystems.

In another aspect, a method includes providing a marker with a substance-dispensing tip for writing on a marker board. The method also includes capturing signals from a motion sensor in the marker as the substance-dispensing tip is moved against the marker board generating visible marks on the marker board, and determining a location of the marker with respect to the marker board. The method includes using the signals from the motion sensor and the location of the marker with respect to the marker board to generate a digitized version of the marks on the marker board.

The details of the present disclosure, both as to its structure and operation, can be best understood in reference to the accompanying drawings, in which like reference numerals refer to like parts, and in which:

DETAILED DESCRIPTION

Figure 1:
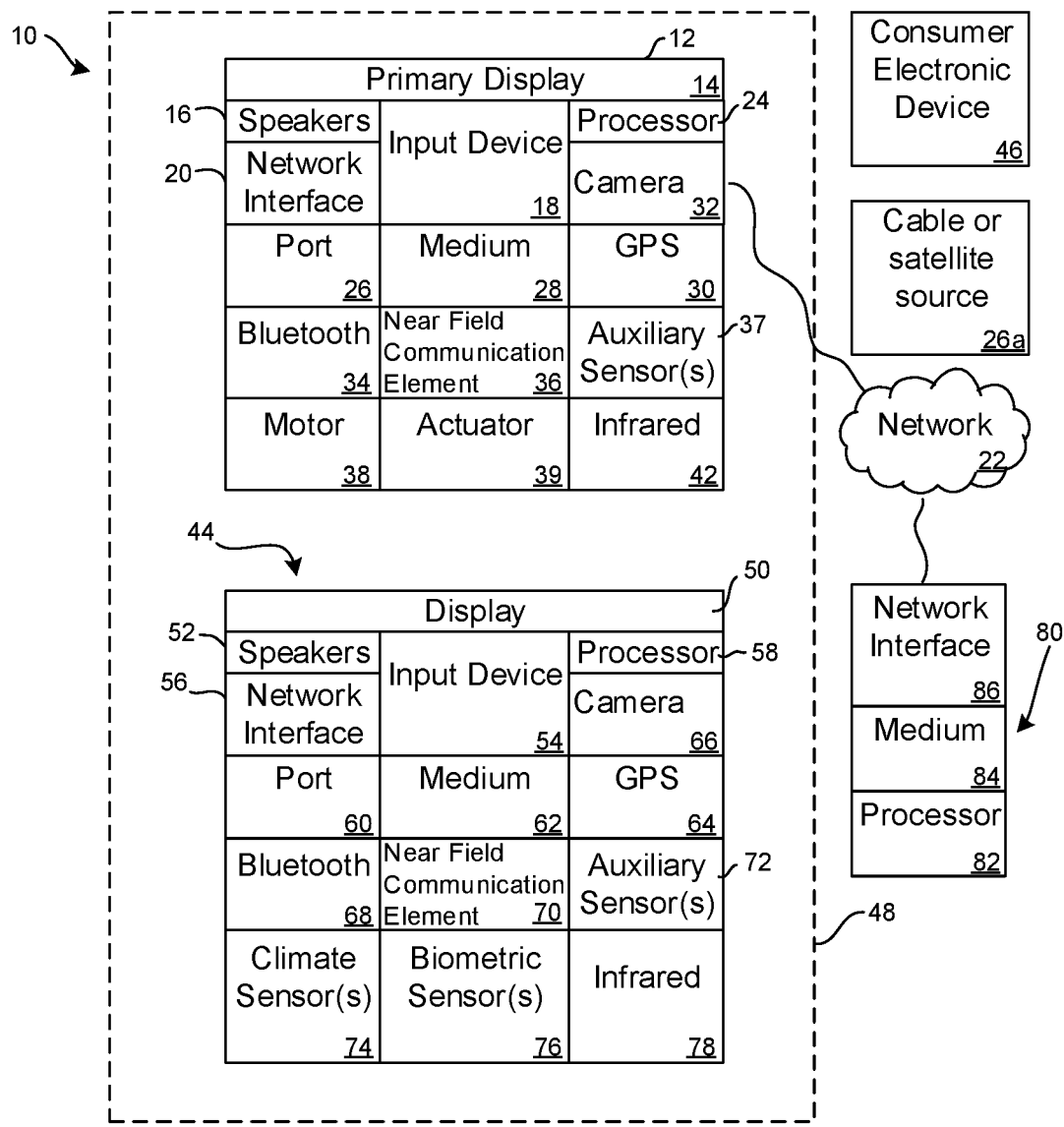
FIG. 1 is a block diagram of an example system including an example inconsistent with present principles.

This disclosure generally relates to computer ecosystems including aspects of consumer electronics (CE) device based user information in computer ecosystems. A system herein may include server and client components, connected over a network such that data may be exchanged between the client and server components. The client's components may include one or more computing devices including portable televisions (e.g. smart TVs, Internet-enabled TVs), portable computers such as laptops and tablet computers, and other mobile devices including smartphones and additional examples discussed below. These client devices may operate with a variety of operating environments. For example, some of the client's computers may employ, as examples, operating systems from Microsoft, or a Unix/Linux operating system, or operating systems produced by Apple Computer or Google. These operating environments may be used to execute one or more browsing programs, such as a browser made by Microsoft or Google or Mozilla or other browser program that can access web applications hosted on the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field-programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet-enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized/automated Internet-enabled headphones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, magnatometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the aforementioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or another appropriate interface such as, e.g., a wireless telephony transceiver.

Accordingly, in some embodiments, the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
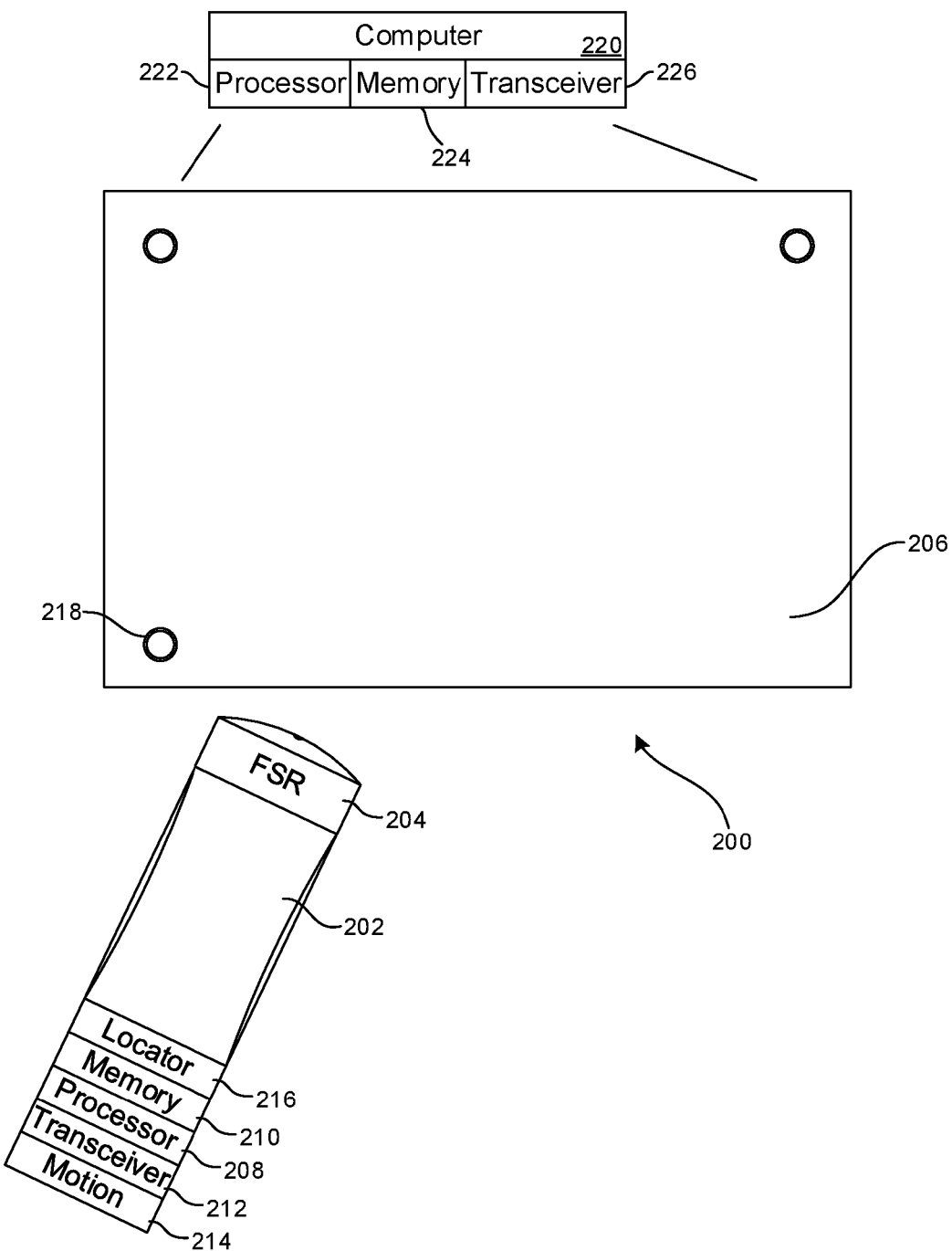
FIG. 2 is a schematic diagram of an example specific system consistent with present principles.

FIG. 2 shows system 200 that includes a hand-holdable marker which be defined by a lightweight, typically elongated hollow plastic housing 202 having a substance-dispensing end 204. In example embodiments, the substance-dispensing end 204 may dispense chalk or "dry-erase" ink onto a substrate 206 such as a vertically oriented marker board 206 when a person moves the end 204 against the substrate 206. The substance so deposited onto the substrate 206 makes visible marks that together form handwriting, symbols, figures, and whatever else the person is doing the writing desires to present.

The system 200 can include any appropriate components disclosed above in relation to FIG. 1. For example, various components of the first CE device 44 may be implemented in the marker 202, including a processor 208 accessing a computer storage 210, and one or more wireless transceivers 212 such as radio-frequency identification (RFID) transceivers, ultra wide band (UWB) transceivers, Bluetooth Low Energy (BLE) transceiver, Wi-Fi transceivers, infrared (IR) transceivers, etc. One or more motion sensors 214 may be on the marker 202. The motion sensor(s) 214 may include one or more accelerometers, gyroscopes, magnetometers, and combinations thereof. A locator component 216 may also be provided for communicating, through its own transceiver or through the transceiver 212, location signals of the marker 202. The locator component 216 may include a global positioning satellite (GPS) receiver or it may be part of a UWB subsystem along with, e.g., the transceiver 212. The components shown in the marker of FIG. 2 typically are controlled by the processor 208, which may be implemented by any appropriate processing circuitry as described herein.

When, for example, UWB is used, one or more UWB receivers 218 may be mounted on surfaces that are not attached to the marker 202. For example, the UWB transceivers may be mounted on the substrate 206 or elsewhere in a room in which the substrate 206 is located.

A computer 220 such as may embody components of the AVDD 12 or second CE device 46 or server 80 in FIG. 1 may include one or more processors 222, one or more computer storages 224, and one or more network interfaces 226 for communicating with the UWB receivers 218 and marker 202 for executing logic below. Or, the processor 208 of the marker may execute the logic. In any case, it is to be understood that the logic herein may be executed by any one or more of the computing devices shown in FIG. 2, including by one or more of the marker 202 and computer 220 embodied as a CE device in the same room as the substrate 206 or as a cloud server or other computing device. It is to be further understood that the computer 220 may include one or more audible and/or visual displays, such as any of those described above in relation to FIG. 1, for presenting user interfaces (UI) such as that shown in FIG. 5, described below.

The system 200 includes two and in some embodiments three subsystems. As disclosed in further detail below, a first subsystem determines the absolute position of the marker 202 relative to a marker board 206, a second subsystem on the marker captures sensor data generated by handwriting on the marker board 206 using the marker 202, and if desired a third subsystem generates digital handwriting that may be refined using a learning algorithm for handwriting recognition based on data from the first and second subsystems.

In some embodiments a contact or proximity sensor "FSR" may be provided, typically near the end 204 of the marker 202. Without limitation, the contact or proximity sensor may be a force sensing resistor, a capacitive or inductive proximity sensor, or another appropriate sensor for generating a signal representing the end 204 being substantially against the substrate 206, as when a person uses the marker 202 to write on the substrate 206.

Figure 3:
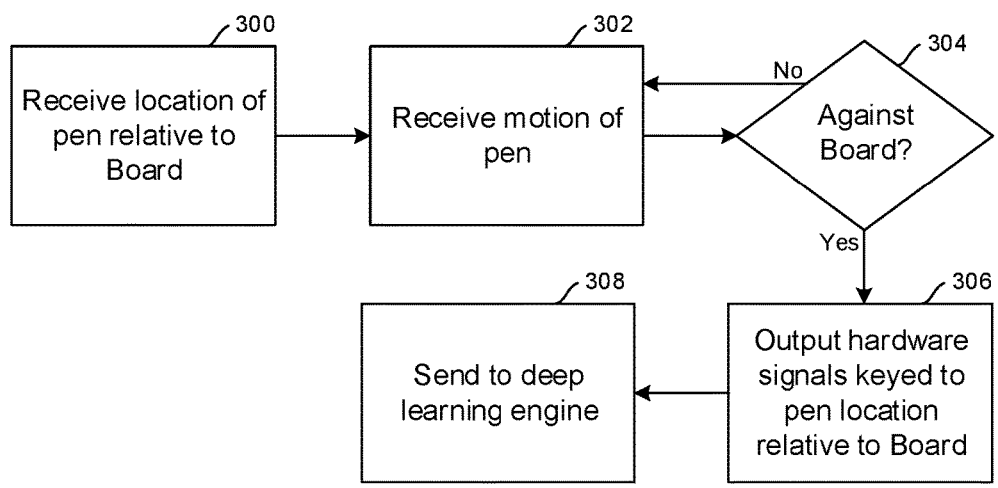
FIGS. 3 and 4 are flow charts of example logic consistent with present principles.

Now referring to FIG. 3, a processor such as any of those disclosed herein can receive a location of the marker 202 relatives to the substrate 206. This may be done using triangulation of UWB signals received by the UWB receivers 218 from the UWB transceiver 212 of the marker 202. Or, considering that the substrate 206 typically does not move and hence is in a fixed location the GPS coordinates of which can be determined, the location of the marker 202 relative to the substrate 206 may be done by receiving a location signal from the GPS transceiver 216 or other locator unit and comparing it to the location of the center of the substrate 206.

Proceeding to block 302, signals are received from the motion sensor(s) 214 representing motion of the marker 202. If desired, the logic may proceed to decision diamond 304 to determine, based on signals from the contact/proximity sensor in FIG. 3, whether the end 204 is substantially against the substrate 206, to ensure that digitized handwriting is produced only when the marker 202 is being used to write on the substrate 206. If the test at diamond 304 is negative, the logic may loop back to block 302 as shown, but otherwise the motion signals may be correlated by the processor to handwriting characters or simply marks as in a drawings by the person, correlating the digitized marking relative the center (or edges or four corners or other appropriate reference) of the substrate 206 if desired based on, e.g., the above-described location signals from UWB receivers or the GPS receiver in the marker 202.

Figure 4:
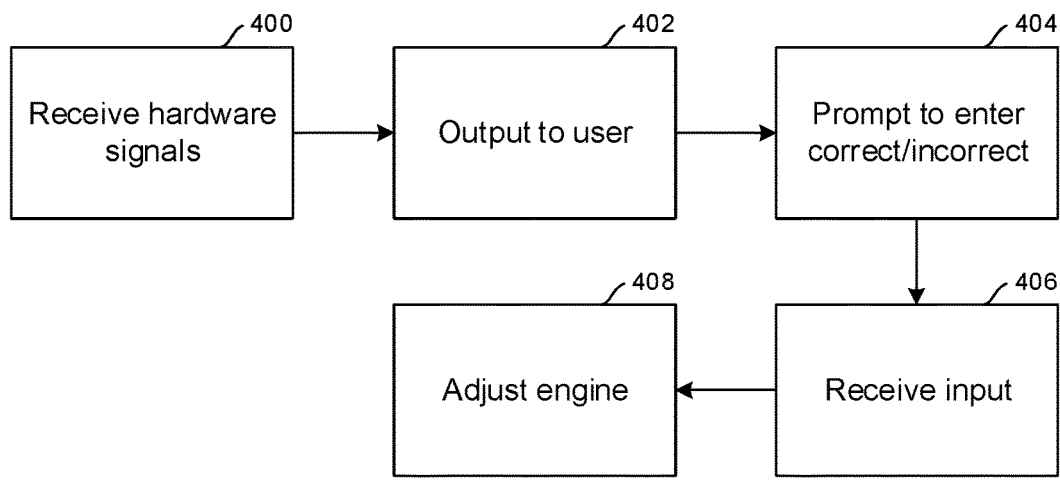
Figure 5:
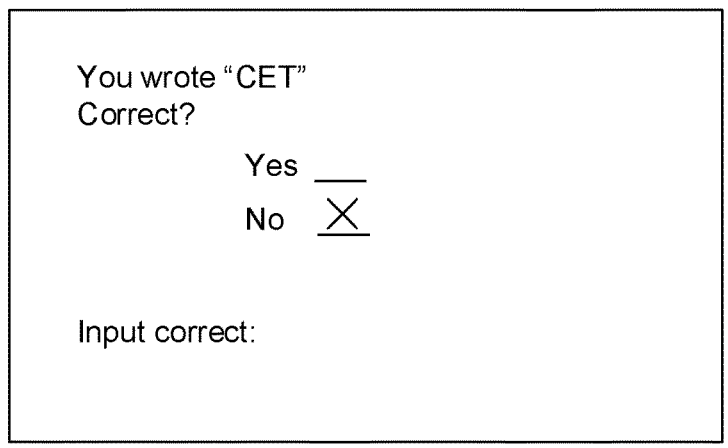
FIG. 5 is an example user interface (UI) that is related to FIG. 4.

Moving to block 308, the digitized translation of the motion signals may be input to a machine/deep learning algorithm to classify marks as handwriting characters or symbols or as drawing lines or other objects, refining the determination of what the person wrote according to machine learning principles known in the art, a simplified example of which is shown in FIGS. 4 and 5.

Specifically, as shown at block 400 in FIG. 4, signals representing digitized translations of marks the user has made on the substrate 206 using the marker 202 are received and classified. The result may be output to the user at block 402. The user may be prompted at block 404 to correct or otherwise refine the output at block 402, which corrections/refinements are received at block 406 and used to adjust the learning engine or algorithm at block 408.

FIG. 5 illustrates. As shown, the user is prompted that the processor executing the learning algorithm believes the user wrote "CET" on the substrate 206. The user may indicate that this is correct by selecting the "Y" selector, or he may indicate it is incorrect by selecting the "N" selector as shown and indicated by the "X". If "N: is selected the user may be prompted to input the correct writing, which in this case could be "CAT". The learning algorithm is refined accordingly.

Without limitation, the principles divulged in the present assignee's U.S. Pat. No. 9,582,727 and in U.S. Pat. No. 8,165,398, both of which are incorporated herein by reference, may be used as learning engines consistent with present principles.

While particular techniques are herein shown and described in detail, it is to be understood that the subject matter which is encompassed by the present application is limited only by the claims.

What is claimed is:
1. A system comprising:
   at least one hand-holdable marker with a substance-dispensing end;
   at least one substrate a person can mark on by moving the substance-dispensing end of the marker against the substrate to cause substance from the substance-dispensing end to be deposited on the substrate;

at least one motion sensor operably associated with the marker to sense motion of the marker; and at least one processor configured for receiving signals from the motion sensor for conversion of the signals to a digital domain, the processor being configured to access instructions executable by the processor to:

implement at least one learning algorithm for conversion of the signals from the motion sensor to a digital domain, the learning algorithm receiving and classifying the signals and outputting a result prompting refinement of writing using the marker, refinements of writing using the marker being used to adjust the learning algorithm.

2. The system of claim 1, wherein the motion sensor comprises at least one gyroscope on the marker.

3. The system of claim 1, wherein the motion sensor comprises at least one accelerometer on the marker.

4. The system of claim 1, comprising:

at least one location system configured for generating signals representative of a location of the marker relative to the substrate.

5. The system of claim 4, wherein the location system comprises at least one ultra wide band (UWB) transceiver.

6. The system of claim 5, wherein the UWB transceiver is a first UWB transceiver on the marker, and the location system comprises at least a second UWB transceiver not on the marker and configured for communicating with the first UWB transceiver.

7. The system of claim 4, wherein the location system comprises at least one global positioning system (GPS) transceiver on the marker.

8. The system of claim 1, wherein the instructions configure the processor to:

output and indication of what the learning algorithm believes was written using the marker;

receiving input indicating whether the indication is correct; and refining the learning algorithm based at least in part on the input.

9. A system, comprising:

a first subsystem configured to determine an absolute position of a marker;

a second subsystem on the marker configured to capture sensor data generated by handwriting on the marker board using the marker; and a third subsystem to generate digital handwriting refined using a learning algorithm for handwriting recognition based on data from the first and second subsystems, the learning algorithm receiving and classifying signals from the second subsystem and outputting a result prompting refinement of writing using the marker.

10. The system of claim 9, wherein the receivers comprise at least one ultra wide band (UWB) transceiver.

11. The system of claim 9, wherein the second subsystem comprises at least one gyroscope.

12. The system of claim 9, wherein the second subsystem comprises at least one accelerometer.

13. A method comprising:

providing a marker for writing on a marker board;

capturing signals from a motion sensor in the marker as the marker is moved relative to the marker board; and implementing at least one learning algorithm for conversion of the signals from the motion sensor to a digital domain, the learning algorithm receiving and classifying the signals and outputting a result useful for refining use of the marker, refinements of use being useful to adjust the learning algorithm.

14. The method of claim 13, wherein capturing signals from a motion sensor in the marker comprises capturing signals from at least one accelerometer.

15. The method of claim 13, wherein capturing signals from a motion sensor in the marker comprises capturing signals from at least one gyroscope.

16. The method of claim 13, comprising determining a location of the marker with respect to the marker board using ultra wide band (UWB) signaling.

17. The method of claim 13, comprising determining a location of the marker with respect to the marker board using global positioning satellite (GNSS) information from the marker.

18. The method of claim 13, comprising using the signals from the motion sensor and a location of the marker with respect to the marker board to generate a digitized version of marks on the marker board.

19. The method of claim 13, wherein capturing signals from a motion sensor in the marker comprises capturing signals from at least one magnetometer.

* * * * *